INVENTORS.
William B. Handwerk
Edward L. Pangborn

United States Patent Office 3,090,513
Patented May 21, 1963

3,090,513
PIPE SUPPORTING AND TURNING ASSEMBLY
William B. Handwerk and Edward L. Pangborn, Tulsa, Okla., assignors to Crose-Perrault Equipment Corporation, Tulsa, Okla., a corporation of Oklahoma
Filed Aug. 22, 1960, Ser. No. 51,067
3 Claims. (Cl. 214—340)

The present invention relates to supporting and turning assemblies, and more particularly to a supporting and turning assembly for pipe sections or other elongated generally cylindrical objects.

The present invention proposes to provide a supporting and turning apparatus for pipes or similar objects wherein there is provided a single roller for turning the pipe or other object, and wherein there is further provided movable arms for receiving the object on the apparatus, for holding the object on the apparatus in engagement with the wheel for rotating the object, and for permitting the removal of the object from the apparatus when the turning operation has been completed.

It is, therefore, a primary object of the present invention to provide apparatus for supporting and turning a pipe or other similar object, wherein the apparatus is provided with a single drive roller for frictionally engaging and driving the pipe, and wherein the apparatus is further provided with movable arms for receiving the object on the apparatus for holding the object thereon in frictional driving engagement with the drive wheel and for permitting the object to be removed from the apparatus when the rotating operation has been completed.

It is a further object of the present invention to provide structure of the type above described, wherein the movable arms are provided with casters or the like which are freely rotatable and engage with the outer surface of the object to support the object while permitting the same to rotate unimpeded.

It is a further object of the present invention to provide structure of the type above described wherein the apparatus is elongated, and the structure including the drive wheel is positioned adjacent to one end thereof, and wherein the apparatus is further provided with a second wheel adjacent the other end thereof, each of said wheels being provided with a set of movable arms of the type above described, thereby permitting the support and rotation as previously set forth of an elongated object.

Further objects and advantages of the present invention will become apparent as the description of the invention proceeds and are intended to be covered by the scope of the appended claims. It will also be obvious that various modifications and changes may be made to the structure of the present invention without departing from the spirit thereof, and such modifications and changes are also intended to be covered by the scope of the appended claims.

Figure 1:
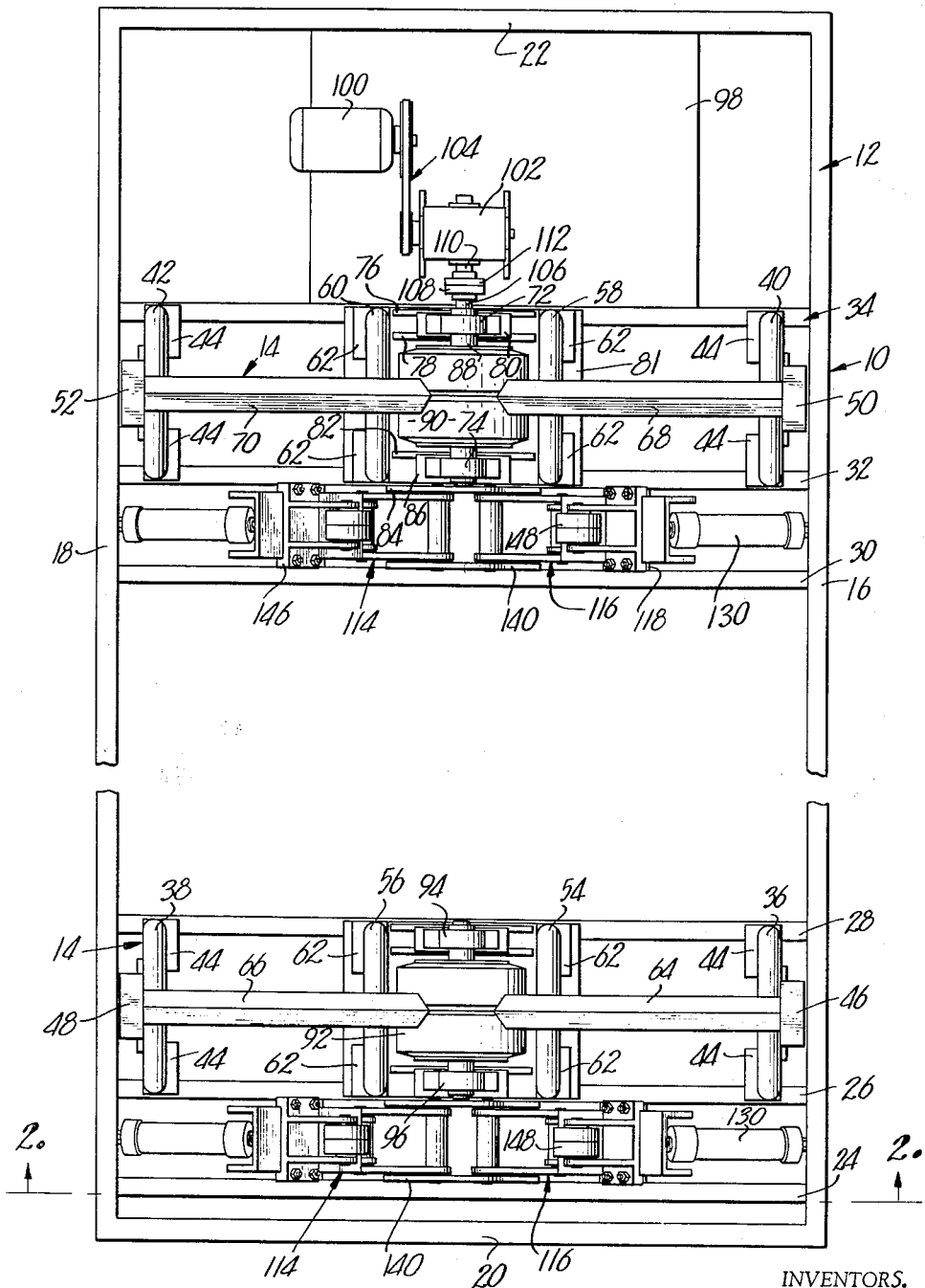
FIGURE 1 is a top plan view of structure embodying the present invention.

There is shown in the drawings support means, indicated generally by the numeral 10, and primarily including a subframe 12 and a frame 14. The subframe 12 includes a pair of spaced, parallel side members 16 and 18, both of which are elongated and joined at their ends by spaced, parallel end members 20 and 22. As can be seen by referring to FIG. 2, each of the side members 16 and 18 and the end members 20 and 22, are channel members having inwardly directed flanges relative to the perimeter of the subframe 12. A plurality of spaced, parallel, transverse members 24, 26, 28, 30, 32 and 34 extend between side members 16 and 18 for a purpose which will subsequently be described. It should be noted, however, that the members 24 and 26, and the members 30 and 32, are spaced a like distance, and the members 26 and 28, and the members 32 and 34 are spaced a like distance. The spacing between members 30 and 32 is less than that between members 32 and 34. Similarly, the spacing between members 24 and 26 is less than that between members 26 and 28.

Frame 12 includes inverted V-shaped supports 36, 38, 40 and 42, the open end legs of which are supported from plates 44 extending from cross members 26 and 28 and 32 and 34. It will be noted, particularly by referring to FIG. 1, that inverted V-shaped members 36 and 38 are generally parallel to each other and to the respective side members 16 and 18 and supported from subframe cross members 26 and 28, adjacent to the respective sides 16 and 18. It will be further noted that the inverted V-shaped members 40 and 42 are generally parallel, and parallel to the respective side members 16 and 18 and are supported from cross members 32 and 34 adjacent to the respective sides 16 and 18.

It will be further noted, that the outwardly-facing sides of the V-shaped members 36 and 38 each support angle iron, skid-receiving members 46 and 48, and similarly V-shaped members 40 and 42 support skid-receiving members 50 and 52. Second inverted V-shaped supports 54, 56, 58 and 60 are supported from plates 62 of respective cross members 26, 28, 32 and 34. Second inverted, V-shaped support 54 is spaced inwardly from support 36 and generally parallel thereto, second support 56 is spaced inwardly from support 38 and generally parallel thereto, second support 58 is spaced inwardly from support 40 and generally parallel thereto, and second support 60 is spaced inwardly from support 42 and generally parallel thereto.

It will now be seen that the apices of the supports 36, 54, 56 and 38, and of the supports 40, 58, 60 and 42, are in the same respective vertical planes which are generally parallel. An angle iron member extends from the apex of support member 36 over the apex of support member 54, and is designated by the numeral 64. Similarly, a second angle iron 66 extends from the apex of member 38 over the apex of second support member 56. It will, therefore, be apparent that the first and second angle iron members 64 and 66 have their respective apices in the same vertical plane and extend inwardly toward each other terminating in spaced relation with each other. Third angle iron member 68, and fourth angle iron member 70, are similarly positioned relative to supports 40 and 58 and 42 and 60 respectively.

Means are provided for rotating an object supported on the frame structure including a first pair of bearing support members 72 and 74. Support member 72 is supported in elevated relationship above cross member 34 by flanges 76 and 78 and cover 80 extending between the flanges 76 and 78. Flanges 76 and 78 are supported from plate 81 which extends between cross members 34 and 32, such that the entire structure is supported from the cross members 34 and 32. Bearing support member 74 is supported by flanges 82 and 84 and cover 86 extending between the flanges. In this case, however, flange 82 is supported from plate 81, while flange 84 is supported directly from cross member 32.

A roller shaft 88 is journalled in bearing support members 72 and 74 and there is mounted thereon a roller 90 which may be provided with an outer surface of rubber or other similar material. A second roller 92 is journalled in second bearing support members 94 and 96 supported from the cross members 26 and 28 in a manner similar to that described for the first bearing support members 72 and 74.

A drive table 98 extends between end member 22 and cross member 34 and there is mounted thereon a prime mover 110 which may be an electrical or hydraulic motor or the like, and a gear reduction unit 102 coupled with a belt and pulley drive arrangement 104 which interconnects the gear reduction unit 102 and the prime mover 100. It will be noted that in the case of roller 90, shaft 88 extends through bearing support member 72 and terminates in a shoulder 106 provided with a first coupling member 108. Gear reduction unit 102 is provided with an output shaft 110 which has mounted thereon a second coupling member 112, and the gear reduction unit is positioned relative to the drive roller such that the first and second coupling members 108 and 112 are in engagement with each other and, therefore, roller 90 is driven by prime mover 100.

A pair of first support arms generally indicated by the numeral 114, and a pair of second arms generally indicated by the numeral 116, are provided in spaced relation on the subframe 12 adjacent each end of the apparatus to receive an object such as an elongated, cylindrical pipe onto the frame, support it while it is present on the frame in frictional driving engagement with rollers 90 and 92, and further to permit removal of the object from the frame when the rotating process has been completed. Inasmuch as there are a pair of the first arms 114 and second arms 116, and inasmuch as all of the arms are identical in construction, only one of the arms will be described; but it is to be remembered that several pairs are present in the embodiment shown in the drawings and that as many pairs as from one to a plurality may be provided as required by the length of the object to be handled, and as limited by the size of the machine.

Figure 3:
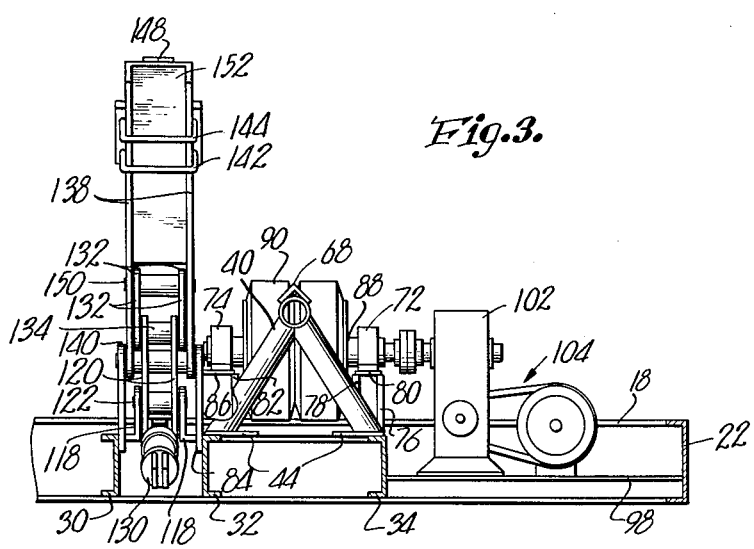
FIG. 3 is a fragmentary, side elevational view with the base side member removed to reveal transverse frame structure in cross section of the structure shown in FIG. 1 of the drawings.

Referring now specifically to the support arm 116 supported from cross members 30 and 32 and specifically shown in FIG. 3 of the drawings, it will be noted that a pair of ears 118 are supported in upstanding relationship to the cross members 30 and 32 and are generally parallel and in spaced relationship to each other. A pair of bell crank members 120 are mounted in spaced, parallel relationship on a shaft 122 for rotation therewith. The shaft 122 extends beyond the bell crank members 120 on both sides and is journalled in the respective ears 118 for pivotal movement of the bell crank members 120 relative to the ears 118.

Figure 2:
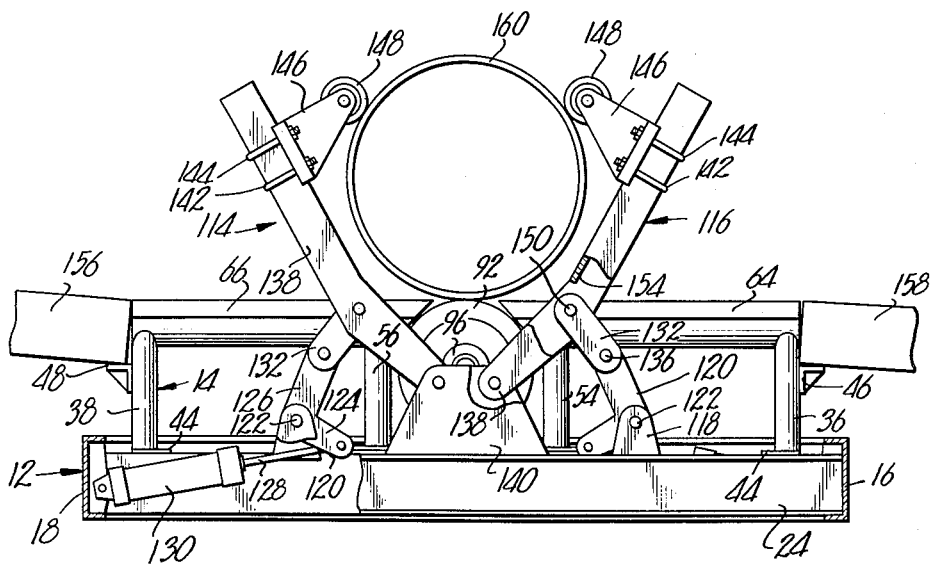
FIG. 2 is a transverse, cross-sectional view taken along lines 2—2 of FIG. 1 looking in the direction of the arrows and with portions broken away to show details of construction.

Bell crank members 120 comprise legs 124 and 126, and leg 124 is pivotally connected at the end remote from leg 126 to piston 128 of hydraulic ram 130, which in turn is mounted to side subframe member 16, as shown in FIG. 1. It will be noted that for ease of understanding, similar numbers have been placed on similar parts of a second support arm 114 as shown in FIG. 2, and reference may be had to this figure for ease in understanding.

Legs 126 of bell crank 120 terminates intermediate links 132 at one end of the latter, and the respective legs 126 are provided with a sleeve 134 of the hollow cylindrical variety through which a pivot pin 136 extends which joins the links 132 in spaced, parallel relationship for pivotable movement relative to legs 126. A pair of spaced, parallel arms 138 are provided which are pivoted at one end to brackets 140 and are shaped similarly to an obtuse angled bell crank.

At the end of arms 138, remote from bracket 140, a pair of U-shaped brackets 142 and 144 are provided extending around the outwardly-facing edges of the arms 138, the open ends of said members being screw-threaded and adapted to have fitted thereon a caster 146, the same being secured to the U-shaped brackets in a common manner such as by the use of nuts. Each caster 146 has rotatably mounted therein, a roller 148 which may be provided with an outer surface of rubber or similar material. Intermediate the point of connection of arms 138 with bracket 140 and the point of mounting of the casters 146, arm 138 is fixed to links 132 by a pin 150. It will be noted that links 132 are positioned intermediate arms 138 and that pin 150 extends through the links 132 and into engagement with the arms 138. It will be further noted that arms 138 are joined at their edges by plates 152, as shown in FIG. 3, and plates 154 as shown in FIG. 2.

It should be further noted at this point that when the device of the present invention is in use, a pair of oncoming skids 156 and a pair of outgoing skids 158 are provided. The skids 156 rest upon the skid-receiving members 48 and 52, and the skids 158 rest upon the skid-receiving members 46 and 50.

In operation, when it is desired to rotate a pipe upon the turning and supporting assembly, the structure of which has been described, a pipe is rolled down by the force of gravity or by hand, along oncoming skids 156 onto angle iron members 70 and 66 respectively. In order for this operation to take place, the hydraulic ram 130, which is operated by hydraulic structure of a well-known type and not described in this application, moves the support arms 114 to a position below the uppermost extent of the frame member 14 so that the pipes may roll over the arm and the caster 146 and caster wheel 148. After the pipe or other object 160, has passed thereover, the arms 114 are returned to the position shown in FIG. 2 in the drawings. As the pipe 160 reaches the longitudinal center line axis of the apparatus described, it will drop into the space between the respective angle iron members 64 and 66 and 68 and 70, so the pipe or other object 160 is in engagement with a portion of the periphery of the rollers 90 and 92 extending upwardly into the space between said angle iron members, such engagement being along a line extending along the surface of the pipe 160 and parallel to the longitudinal axis thereof.

When the second support arms 116 are in the position shown in FIG. 2, the pipe 160 will be held in the position described atop rollers 90 and 92. When the prime mover 100 drives the rollers 90 and 92, the pipe 160 will be rotated. The pipe 160 is supported against any tendency to move off of the rollers 90 and 92 by the caster wheels 148 which permit the pipe to rotate freely.

When it is desired to remove the pipe or elongated object 160 from the apparatus, second support arms 116 are moved to the position below the uppermost extent of frame 14, as was described with reference to the first support arms, by the rams 130. The pipe may then be rolled by hand onto the off-going skid 158. The second support arms 116 are then returned to the position shown in FIG. 2, and the first support arms 114 are lowered to receive the next pipe or object 160 when the same comes off of oncoming skid 156.

If it is desired to have additional help in starting the pipe or object 160 to roll off of the apparatus described, rams 130 of first support arms 114 may be operated to partially withdraw the first support arms 114 toward lowered position. Understanding that the second support arms 116 are in their lowered position, the rams 130 may then be reversed and returned to their position shown in FIG. 2 of the drawings, thereby imparting motion to the pipe or object 160 described, and causing the same to roll onto the angle iron members 68 and 64 and toward the outgoing skid 158.

Having thus described the invention what is claimed as new and desired to be secured by Letters Patent is:

1. In a supporting and turning apparatus, an elongated subframe; an elongated frame supported in spaced, elevated, parallel, overlying relationship to said subframe;

a plurality of supports coupled with said frame for supporting an elongated cylindrical object deposited thereon; a pair of first arms movably coupled with said subframe on one side thereof, one adjacent each end of said subframe; a fluid ram coupled with said subframe and each first arm for moving each first arm between a first position projecting above said frame and a second position retracted below said frame; first over-center toggle structure coupling each first arm with its respective ram; a pair of second arms movably coupled with said subframe on the side opposite said one side thereof, one adjacent each end of said subframe and aligned with said first arms; a fluid ram coupled with each of said second arms and said subframe for moving said second arms between a first position projecting above said frame and a second position retracted below said frame; second over-center toggle structure coupling each second arm with its respective ram, the respective first and second toggle structures being in the over-center positions thereof when the arms are in said first positions; a drive roller coupled with said subframe adjacent one end thereof and positioned substantially below the frame with a portion of its periphery elevated above said frame; a prime mover drivingly coupled with said drive roller for driving the latter; and a second roller coupled with said subframe adjacent the other end thereof and positioned to have a portion of its periphery elevated above said frame whereby said first arms are moved to said second position and an elognated cylindrical object deposited on said supports of said frame against said second arms, said first arms being returned to said first position and cooperating to retain said object therebetween, the periphery of said driving roller engaging with the periphery of the object and thereby rotating the object and the second roller similarly engaged with the object, said second arms being subsequently moved to said second position permitting removal of said object from said supports of said frame.

2. The structure of claim 1, wherein each of said first and second arms are provided with object periphery engaging, freely rotatable wheels whereby said arms provide additional support for said object substantially non-dampening to the rotation thereof when said arms cooperate to retain said object upon said frame, there being provided clamp means releasably securing the wheels to respective arms to permit adjusting of the wheels along said arms.

3. The structure of claim 1, wherein said plurality of supports includes a pair of aligned support members adjacent each end of said frame, aligned with said rollers and extending from opposite sides of said frame toward the center thereof and terminating in spaced relation to said rollers whereby said object drops off of said support members on the receiving side of said frame onto said rollers as it is being received on the apparatus and must be rolled onto the supports on the removal side thereof for subsequent removal.

References Cited in the file of this patent

UNITED STATES PATENTS

| | | |
|---|---|---|
| 960,640 | Heggie | June 7, 1910 |
| 1,870,760 | Tifton | Aug. 9, 1932 |
| 1,924,005 | Stevens | Aug. 22, 1933 |
| 2,403,662 | Hurley | July 9, 1946 |
| 2,894,450 | Steinitz | July 14, 1959 |